No. 709,613. Patented Sept. 23, 1902.
F. STEBLER.
FRUIT GRADER.
(Application filed July 5, 1901.)
(No Model.)
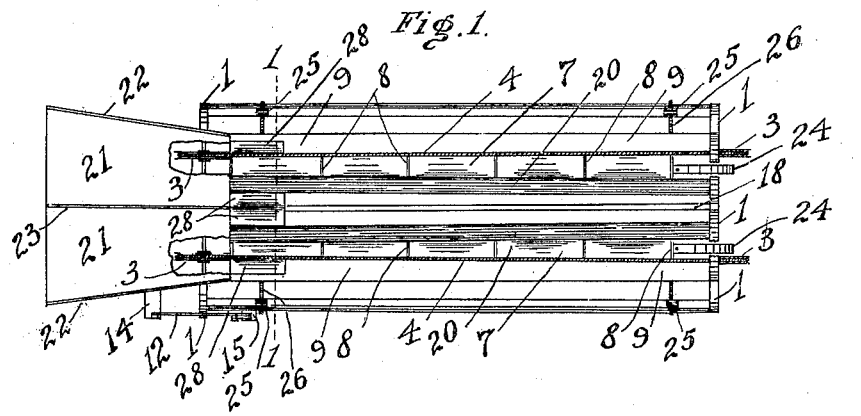
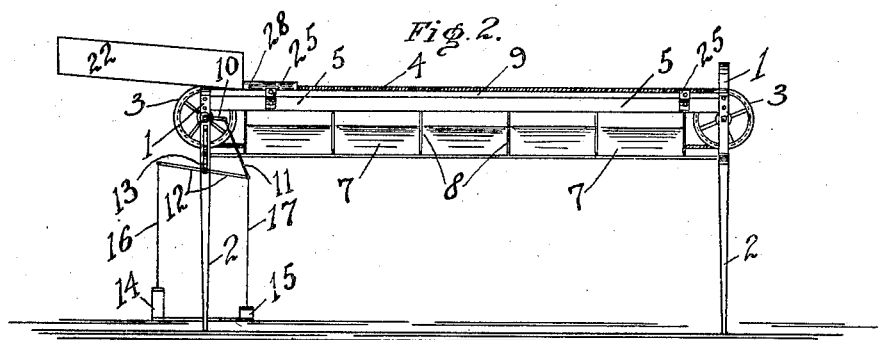
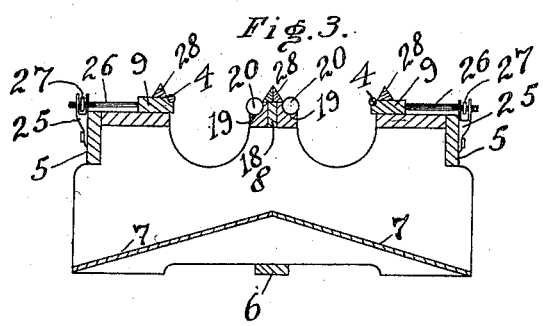
WITNESSES:
INVENTOR
Fred Stebler
BY
James R Rogers
his ATTORNEY

UNITED STATES PATENT OFFICE.

FRED STEBLER, OF RIVERSIDE, CALIFORNIA.

FRUIT-GRADER.

SPECIFICATION forming part of Letters Patent No. 709,613, dated September 23, 1902.

Application filed July 5, 1901. Serial No. 67,235. (No model.)

*To all whom it may concern:*

Be it known that I, FRED STEBLER, a citizen of the United States, residing at Riverside, in the county of Riverside and State of California, have invented a new and useful Fruit-Grader, of which the following is a specification.

This invention relates to apparatus for sizing or grading fruit; and some of the objects of the invention are to provide an apparatus of this character which is simple and cheap in construction and at the same time positive and effective in operation.

Another object of the invention is to provide or impart a rotary motion to the fruit, so that the same will be sized or graded closer by reason of the difference in dimensions of the fruit in different parts.

A further object of the invention is to provide for the adjustment of the carriers.

It is also an object of this invention to provide a longitudinally-stationary but laterally-yielding surface to the fruit as the latter is progressed by the traveling carrier adjacent to such surface.

With these and other objects in view the invention consists, essentially, in the construction, combination, and arrangement of parts, substantially as hereinafter more fully described in the following specification and illustrated in the accompanying drawings, in which—

Figure 1 is a top plan view of an apparatus embodying my improvements. Fig. 2 is a side view of the same, and Fig. 3 is an enlarged transverse section taken on lines 1 1 of Fig. 1.

Similar characters of reference designate corresponding parts throughout the several views.

Referring to the drawings, the reference-character 1 designates end frames of any preferred construction, which may be provided with legs or supports 2, secured thereto in any preferred way, and mounted in said frames are sheave-wheels or like devices 3, preferably constructed to receive an endless rope, chain, or cable 4, and said end frames are preferably united by corner-pieces 5 and a bottom-piece 6, preferably substantially as herein shown, to give rigidity to the apparatus, and above the bottom plate or piece 6 is preferably secured an inclined or diverging bottom 7, extending to an apex or ridge beneath the longitudinal center of the apparatus, and upon the bottom are preferably secured partitions 8 to direct the graded or sized fruit into a proper receptacle, it being understood that the inclined bottom is constructed to receive the fruit from the conveyer and discharge the same laterally from the apparatus.

Mounted upon the corner-pieces 5 in any suitable manner are adjustable guides 9, constructed to receive and guide the endless conveyer 4, which pass over the sheaves 3 mounted in the end frames of the apparatus, and the shaft of the sheaves at one end of the apparatus is preferably provided with a crank-arm 10, to which is connected a rod or link 11, movably attached to one end of a rocking lever 12, fulcrumed intermediately to a hanger or bracket 13, connected with the apparatus, substantially as herein shown, and treadles 14 and 15 are preferably mounted upon the flooring or upon a base-plate and connected with each end of said rocking lever by rods or links 16 and 17, so that by pressure upon said treadles the rocking lever may be actuated to turn the crank and rotate the sheaves, or other actuating means may be employed, as will be readily understood.

Suitably secured between the end frames 1 is a central plate or timber 18, preferably provided with longitudinal recesses or grooves 19, constructed to receive cylindrical bodies 20, preferably constructed of air-retaining material in order that the same may be inflated with air, gas, or other agents, and these cylindrical bodies or tubes are adapted to receive and support the fruit, in connection with the endless conveyers 4, while the same is being propelled or actuated by the latter, in order that the fruit may be turned over or rotated in its passage through or over the apparatus until discharged therefrom. By means of this construction an elastic or yielding support is provided for the fruit, which may be adjusted or regulated to any pressure or expansibility, and the fruit will be prevented from injury by being brought into contact with a yielding surface as against the stepped or shouldered device usually employed.

The conveyers 4 and the tubes 20 preferably diverge or separate from each other from the feeding end of the apparatus toward the opposite end thereof in order that as soon as the fruit shall have reached a point in its passage through the apparatus where it will not be supported by the diverging conveyer and tube it will drop upon the bottom 7 and be deflected thereby between the partitions 8 into the receptacle therebelow prepared for fruit of that size.

Formed on or connected with the feeding end of the apparatus is a feeding table or chuteway 21, preferably provided with sides 22 and with an intermediate partition 23, substantially as shown, to facilitate the introduction of the fruit into the apparatus, as will be readily understood.

The operation of the apparatus will be apparent from the foregoing description when taken in connection with the accompanying drawings and the following explanation thereof. The fruit to be sized or graded is placed upon the feeding-table 21, from whence it is fed into the apparatus, where it is taken up by the endless conveyers 4 and propelled thereby into contact with the stationary tubes 20 in a rotary manner until the fruit shall have reached a point at which it is no longer supported by the conveyer and tube, whereupon it drops upon the inclined bottom 4 and is discharged laterally from the apparatus, as will be readily understood.

If found desirable in practice, curved bands or plates 24 may be mounted in the end frame 1 in the discharging end of the apparatus, so that all the fruit which is too large to drop between the conveyers and tubes may pass thereover and be discharged thereby from the apparatus into a suitable receptacle.

The guides 9 may be made adjustable by having a screw-threaded rod 26 connected therewith, preferably at each end thereof and passing through the bifurcated portion of supports 25, preferably secured upon the corner-pieces 5 of the frame and on the screw-threaded free ends of said rods 26, and between or within said bifurcated portion are adjusting-nuts 27 to regulate the position of said guides.

This invention is not limited to the specific construction, combination, and arrangement of parts herein shown and described, and the right is reserved to make all such changes in and modifications of the same as come within the spirit of this invention.

What I claim is—

1. A fruit grader or sizer provided with a frame, yielding supporting-tubes, conveyers, said conveyers and tubes diverging from each other and means for operating the conveyers.

2. A fruit grader or sizer provided with a frame, yielding supporting devices, conveyers diverging therefrom and means for operating the conveyers.

3. A fruit grader or sizer provided with a frame, constructed to receive and discharge the fruit, laterally-yielding supporting-tubes, conveyers diverging therefrom and imparting a rotary motion to the fruit, and means for operating the conveyers.

4. A fruit grader or sizer provided with a frame constructed to receive and discharge the fruit, laterally-yielding tubes disposed longitudinally thereof, conveyers arranged at unequal distances therefrom and constructed to impart a rotary motion to the fruit, sheaves for the conveyers and means for operating the sheaves.

5. A fruit grader or sizer provided with a frame constructed to receive and discharge the fruit, pneumatic tubes therein, sheaves mounted in the frame, conveyers passing over said sheaves and arranged at unequal distances from said tubes and means for operating said sheaves.

6. A fruit grader or sizer provided with a frame, adjustable guides to rotate the fruit thereon, conveyers in said guides, sheaves carrying said conveyers, pneumatic tubes diverging from the latter, and means for operating said sheaves.

7. A fruit grader or sizer provided with a frame, guide-plates thereon having a longitudinal groove, endless conveyers traveling in said groove, means for adjusting the guide-plates and means for operating said conveyers.

8. A fruit grader or sizer provided with a frame, guide-plates thereon, conveyers traveling in said plates, supports upon the said frame, screw-threaded rods connected with said plates and having screw-thread connections with said supports to effect the adjustment of the latter to and from an intermediate yieldable supporting-surface and means for operating the conveyers.

9. A fruit grader or sizer provided with a frame, sheave-wheels mounted in the opposite ends thereof, an endless conveyer passing over said wheels, the shaft carrying one set of wheels carrying a crank-arm, a rocking lever, a rod or link connected to said crank and arm and a treadle connected with said lever, whereby the conveyers may be operated.

In testimony whereof I have signed my name to this specification in the presence of two subscribing witnesses.

FRED STEBLER.

Witnesses:
G. M. GIFFEN,
L. B. ALDERETE.